United States Patent [19]

Glomski

[11] 4,211,110
[45] Jul. 8, 1980

[54] METHOD AND APPARATUS FOR CERTIFYING THE OUTPUT TORQUE CURVE OF A HYDRAULIC HOIST FOR USE IN DUMP BODY APPLICATIONS

[75] Inventor: Norman J. Glomski, New Berlin, Wis.

[73] Assignee: The Heil Company, Milwaukee, Wis.

[21] Appl. No.: 19,105

[22] Filed: Mar. 9, 1979

[51] Int. Cl.² .......................................... G01M 19/00
[52] U.S. Cl. .................................. 73/168; 73/133 R; 73/432 SD
[58] Field of Search ................. 73/168, 136 R, 141 R, 73/133 R, 432 SD

[56] References Cited

U.S. PATENT DOCUMENTS 3,765,234  10/1973  Sievert .............................. 73/168 X

FOREIGN PATENT DOCUMENTS

544885  3/1977  U.S.S.R. ..................................... 73/168
585321  12/1977  U.S.S.R. ..................................... 73/168
593104  2/1978  U.S.S.R. ..................................... 73/168

*Primary Examiner*—James J. Gill
*Attorney, Agent, or Firm*—Michael, Best & Friedrich

[57] ABSTRACT

Disclosed herein is a method and test apparatus for use in determining and certifying hoist compliance with one of several minimum body and payload torque requirement curves, which curves establish torque classifications for hydraulic hoists suitable for use in dump body applications. The apparatus is made up of a base frame which simulates a truck chassis, and an upper frame pivotally connected to the base frame and which simulates the under-structure portion of a dump body. The test hoist is mounted to the base and upper frames so that the hoist can be rendered operative to pivot the upper frame through a predetermined range of dump angles. Longitudinally adjustable tension link or estraining arm assemblies are connected to the base and upper frames and are used for successively restraining the pivotal movement of the upper frame to predetermined incremental dump angles within the predetermined range of dump angles. The link assemblies include tension load cells for providing outputs proportional to the longitudinal forces exerted on the link assemblies. A hydraulic pressure source supplies fluid to the hoist at the hoist manufacturer's maximum rated pressure so that the test hoist is operative to pivot the upper frame. Instrumentation is connected to the outputs of the tension load cells to process the outputs to provide a readout of the longitudinal forces exerted on the tension link assemblies at each incremental dump angle so that the torque exerted by the hoist can be determined.

16 Claims, 16 Drawing Figures

$$W = \frac{T@0°}{L@0°}$$

Fig. 5a $$T@\alpha = [(L\cos\alpha) - (A\sin\alpha)] \times W$$

TELESCOPING HOIST

$a = 118.44\,IN.$ $T @ 0° = Fa$

Where $F = (A \times .9p)$ $p @ RELIEF = 2000\,in/lb^2$ $A\ (1^{ST}\,SLEEVE) = 19.6\,in^2$ $T @ 0°\ (BEGINNING\ OF\ 1^{ST}\,SLEEVE) = 4,178,563\,in/lb$

$T @ 16°\ (END\ 1^{ST}\,SLEEVE) = 4,200,437\,in/lb$ $A\ (2^{ND}\,SLEEVE) = 12.6\,in^2$ $T @ 16°\ (BEGIN\ 2^{ND}\,SLEEVE) = 2,700,281\,in/lb.$

$T @ 34°\ (END\ 2^{ND}\,SLEEVE) = 2,557,170\,in/lb$ $A = (3^{RD}\,SLEEVE) = 7.7\,in^2$ $T @ 34° = (BEGIN\ 3^{RD}\,SLEEVE) = 1,562,715\,in/lb$

Fig. 8c

3RD SLEEVE, 2ND SLEEVE, 1ST SLEEVE $a = 104\,IN.$ 50°

$T @ 50°\ (END\ 3^{RD}\,SLEEVE)$ $T = 1,441,440\,in/lb.$

Fig. 9

METHOD AND APPARATUS FOR CERTIFYING THE OUTPUT TORQUE CURVE OF A HYDRAULIC HOIST FOR USE IN DUMP BODY APPLICATIONS

BACKGROUND OF THE INVENTION

The invention relates to establishing and certifying a torque output curve or classification for hydraulic hoists utilized in dump body applications. More particularly, the invention relates to methods and apparatus for determining or certifying whether a hydraulic hoist suitable for use in dump body applications meets a particular minimum body and payload torque requirement curve established in accordance with a mathematical formula presented herein.

A means of classifying hoists has previously been recommended and followed by member companies of the Hydraulic Hoist and Dump Body division of the Truck Body and Equipment Association, Inc. (TBEA) located in Washington, D.C. Reference is made to HYDRAULIC HOIST & DUMP BODY CLASSIFICATION CHART, Issue No. HH4DB774, published by TBEA in January of 1977. It is stated therein that:

The hoist rated net payload by class is based on the torque rating in inch pounds developed by the hoist around its hinge shaft, using an approximate weight of a standard type body, 12" overhand and a water level load. Hinge torque rating on a telescopic hoist will be established at the break-away position, and the hoist shall be capable of raising the rated load through the complete dumping angle.

It is believed that such a minimum torque rating is no longer valid as it does not accurately take into account the fact that the torque required to be exerted by a hoist to lift a given payload decreases as a function of the dump angle increasing. A formula has been derived to establish a new means of classifying hoists according to predetermined minimum body and payload torque requirement curve. In order to obtain a verification of the previous minimum torque rating of a particular hoist provided by an individual company, a relatively unsatisfactory trial and error method has heretofore been necessary.

More particularly, with a predetermined body size mounted upon the hoist to be tested, a load of, for example, steel stock or concrete blocks, with a known weight and center of gravity, was strapped to the body in an attempt to prevent it from moving during the dump cycle. The know weight was selected to correspond to the minimum torque rating of a given classification. If the hoist operated through its complete dump cycle, the hoist then met the minimum torque rating requirement for that classification. In addition to the troublesome requirement of obtaining the proper load, this method of certification proved difficult or unsatisfactory because of the load moving during the dump cycle.

In order to establish the exact minimum torque rating for the hoist, additional material had to be added in increments until such point that the hoist would not raise the load. With the known load, the exact minimum torque rating for the hoist could then be calculated. Under these test conditions, however, the particular angle in the dump angle cycle at which the hoist exerted a minimum torque was not necessarily known. Another serious disadvantage of the prior art procedure required to determine or varify the minimum torque rating of a hoist was the possibility of injury, should any component of the hoist fail during the dump cycle with the dump body heavily loaded.

This invention is concerned with this general area and has among its objects to provide a method and apparatus for use in certifying a torque output curve for a hoist which eliminates the above noted and other disadvantages of prior art certification of hoists.

More particularly, a mathematical formula is presented herein to establish a new means of classifying hoists in classes according to predetermined minimum body and payload torque requirement curves (MTR curves), and this invention has among its objects to provide a method and apparatus for use in determining or certifying whether a test hydraulic hoist utilized in dump body applications meets the MTR curve of a particular class.

Another of the principal objects of the invention is to provide such a method and apparatus for hoist certification which is not subject to the difficulties and the safety hazards involved in the prior art trial and error certification methods.

Another of the objects of the invention is to provide such a method and apparatus which will allow the torque which the hoist exerts at a particular dump angle to be determined.

SUMMARY OF THE INVENTION

In order to achieve the foregoing and other objects, the invention provides a method and apparatus for use in determining whether a hydraulic hoist mechanism suitable for use in dump body applications meets a minimum body and payload torque requirement curve which establishes a given hoist class.

According to the present invention, the test apparatus comprises base frame means for simulating a truck chassis, upper frame means for simulating the under-structure portion of a dumping body, and hinge means for pivotally connecting the upper frame means to the base frame means. The piviotally connected base and upper frame means are adapted for allowing mounting of the test hoist or hoist mechanism to the base and upper frame means so that the hoist can be rendered operative to pivot the upper frame means relative to the base frame means through a predetermined range of dump angles. Longitudinally adjustable restraining means displaced from the hinge means and connected to the base and upper frame means are provided for restraining pivotal movement of the upper frame means to selected incremental dump angles within the predetermined range. The restraining means includes transducer means for providing an output proportional to the longitudinal force exerted on the restraining means.

The test apparatus preferably includes hydraulic pressure source means connected to the test hoist for supplying fluid to the hoist at the hoist manufacturer's maximum rated pressure to render the test hoist operative to pivot the upper frame means and cause a longitudinal force to be exerted on the restraining means at a selected incremental dump angle. Also, the apparatus preferably includes instrumentation means connected to the output of the transducer means and operable to provide a readout of the longitudinal force exerted on the restraining means at selected incremental dump angles.

The test apparatus also preferably includes means for indicating the angle of the upper frame with respect to the base frame, and pressure transducer means connected to the hydraulic pressure source means and having an output coupled to the instrumentation means so that a readout of the pressure of the fluid supplied to the test hoist is provided.

In accordance with a preferred embodiment of the invention, the restraining means comprises tension link means preferably in the form of a pair of tension link assemblies each including means for adjusting the longitudinal length of the assembly, and the transducer means comprises a tension load cell for providing an output proportional to the longitudinal force exerted on the tension link assembly. The adjusting means in each of the tension link assemblies includes replacable extension rods of varying length, with selected length rods pivotally secured to the base and upper frame means, and also includes turnbuckles for connecting the selected length rods and for allowing adjustment of the longitudinal length of the tension link assembly.

Also according to the present invention, a preferred method for use in determining whether a test hydraulic hoist or hoist mechanism meets a minimum body and payload torque requirement curve for a given hoist class comprises the steps of mounting the test hoist to pivotally connected base and upper frames so that the hoist can be rendered operative to pivot the upper frame relative to the base frame from zero degrees through a maximum dump angle, successively restraining the pivotal movement of the upper frame to predetermined incremental dump angles increasing from zero degrees to the maximum dump angle through use of longitudinally adjustable restraining means connected to the base and upper frames, the restraining means including transducer means for providing an output proportional to the longitudinal force exerted on the restraining means, supplying fluid to the test hoist at the hoist manufacturer's maximum rated pressure to render the test hoist operative to pivot the upper frame and cause a longitudinal force to be exerted on the restraining means at each of the incremental dump angles, and processing the output of the tension load cell means for determining the longitudinal force exerted on the restraining means at each of the incremental dump angles.

In accordance with a preferred embodiment, the method further comprises the step of recording in readable form measurements of the length of the lever arm extending between the restraining means and the point of pivotal connection of the base and upper frames, at selected incremental dump angles, for repetitive use in certifying or determining the torque exerted by any hydraulic hoist mounted to the pivotally connected base and upper frames. The preferred method also preferably includes the step of recording in readable form the measurements of the upper frame compensation torques and the incremental dump angles at which the compensation torques occur for repetitive use in certifying any hydraulic hoist mounted to the pivotally connected base and upper frames.

Other objects, features and advantages of the embodiments of the invention will become known by reference to the following drawings, general description, and appended claims.

GENERAL DESCRIPTION OF THE PREFERRED EMBODIMENTS

Figures 1, 1A, 2:
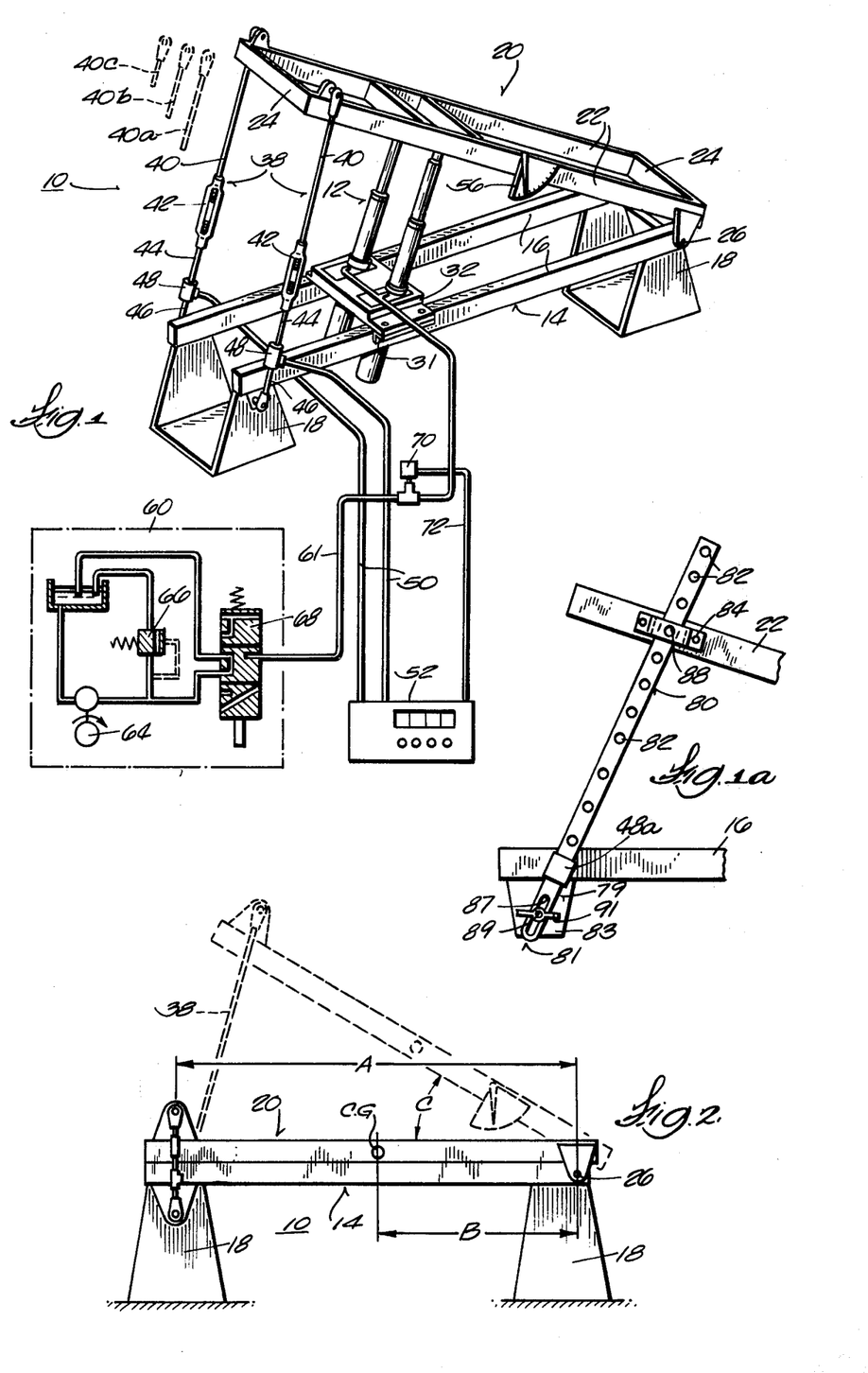
FIG. 1 is a diagrammatic perspective view of a hoist test apparatus which embodies various of the features of the invention.
FIG. 1a is a diagrammatic plan view of a modified portion of the hoist test apparatus shown in FIG. 1 and illustrates an alternative embodiment of the invention.
FIG. 2 is a partial view of the test apparatus shown in FIG. 1, with two positions of the apparatus suitable for torque measurement being illustrated in solid and phantom lines.

Shown in FIG. 1 is a test apparatus 10 for determining or certifying the output torque curve exerted by a hydraulic hoist or hoist mechanism, generally designated 12, of any configuration utilized in dump body applications to determine if the hoist meets the minimum body and payload torque requirement curve (MTR curve) established for a given hoist classification. Before continuing with the description of the test apparatus 10, an explanation will be given of the mathematical derivation of the MTR curves which establish or correspond to hoist classes. Also, two examples of mathematical calculations used to determine output torque curves for two different hoists, the output torque curves plotted for comparsion with particular MTR curves, will be given.

Figure 5:
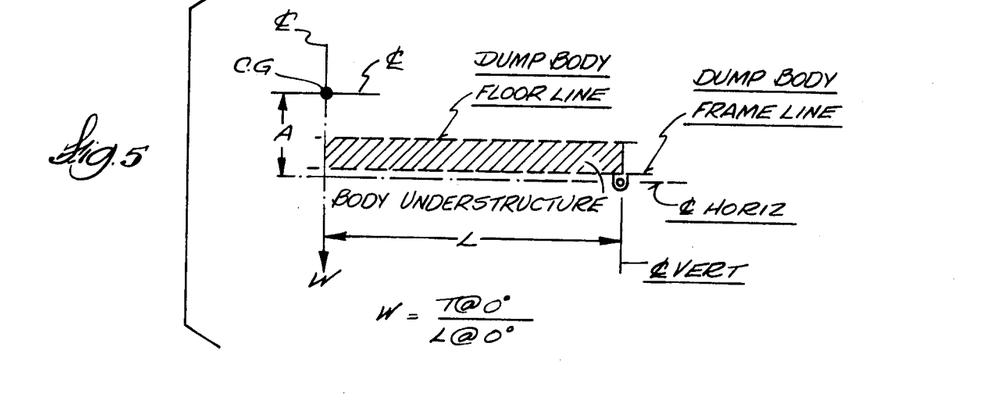
FIGS. 5 and 5a are diagrammatical representations of a loaded dump body including a labeled center of gravity and dimensions used with an illustrated mathematical formula for determining minimum body and payload torque requirement curves corresponding to hoist classifications.

Shown in FIG. 5 is a diagrammatical representation of a loaded dump body including a center of gravity labelled "C.G." and dimensions "A" and "L", illustrated along with mathematical formulas (See FIGS. 5 and 5a) which incorporate such dimensions and which can be utilized for determining minimum body and payload torque requirement curves (MRT curves) for establishing hoist torque classifications.

A Classification Categories Chart for dump body hoists including Classes 10, 20, 30, etc. up to Class 110 and assuming breakaway torques having values previously established by the TBEA as minimum torque ratings for given classes is set forth below. The dimension "L" is defined to be ½ of a standard dump body length (for a given class) minus the length of the overhang of the hinge. The dimension "A" is defined to be the vertical distance from the horizontal axis of the hinge to the center of gravity of the payload having a theoretical weight "W", which can be calculated knowing the distance L and torque "T" at breakaway. The dimension "A" takes into account the distance from the horizontal axis of the hinge to the center of gravity of the payload loaded in a standard dump body in a given class. The Chart follows below:

CLASSIFICATION CATEGORIES CHART DUMP BODY HOIST

| Class | "L" Dim. | "A" Dim. | Torque Requirement (in Lbs. × 10³) | | | |
|---|---|---|---|---|---|---|
| | | | Breakaway | 15° | 30° | 50° |
| 10 | 36" | 24" | 410 | 325 | 218 | 84 |
| 20 | 48" | 24" | 630 | 527 | 388 | 164 |
| 30 | 48" | 24" | 903 | 755 | 556 | 235 |
| 40 | 48" | 24" | 990 | 828 | 610 | 257 |
| 50 | 48" | 24" | 1,350 | 1,129 | 832 | 351 |
| 60 | 60" | 24" | 1,950 | 1,682 | 1,299 | 656 |
| 70 | 60" | 24" | 2,450 | 2,114 | 1,632 | 824 |
| 80 | 72" | 24" | 3,200 | 2,813 | 2,240 | 1,240 |
| 90 | 72" | 24" | 3,800 | 3,341 | 2,660 | 1,473 |
| 100 | 72" | 24" | 4,400 | 3,870 | 3,080 | 1,700 |
| 110 | 84" | 24" | 5,100 | 4,550 | 3,690 | 2,160 |

Dump angle at 50°

Figure 5A:
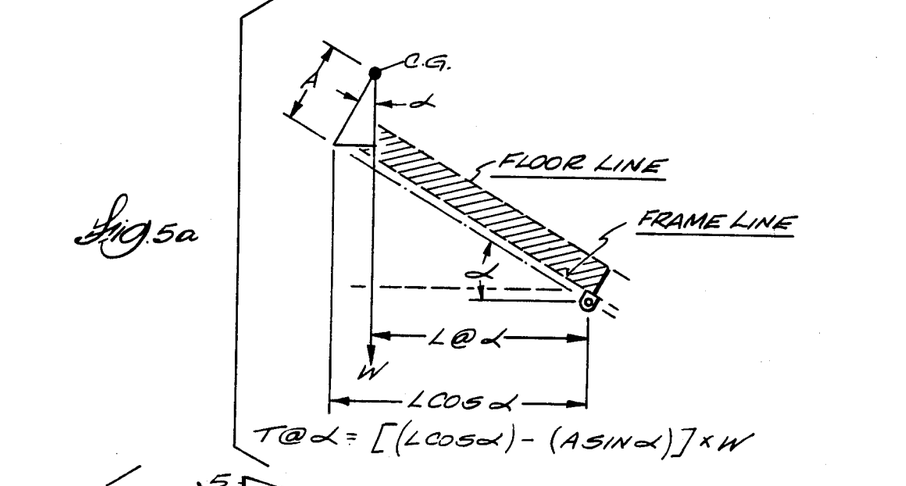

As illustrated in FIG. 5a, the torque at a particular dump angle, Aplha ($\alpha$), can be determined by the expression $T+[(L \cos \alpha)-(A \sin \alpha)] \times W$.

Figure 9:
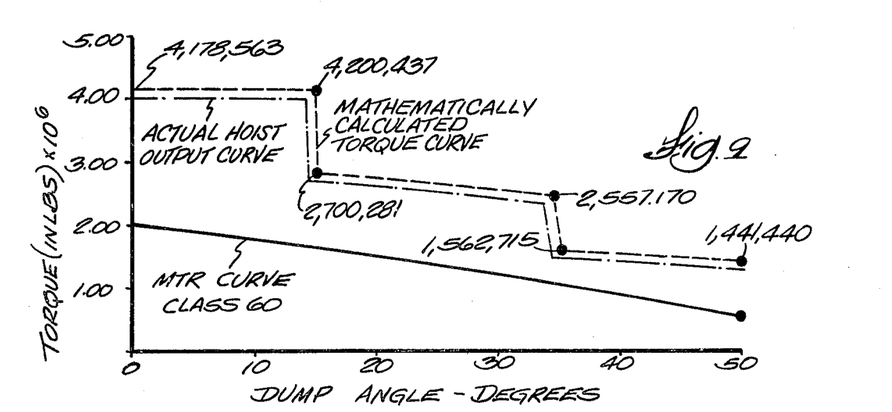
FIG. 9 is a graphical representation of a class 60 MTR curve and a plot of a torque curve determined by the mathematical calculation of torque exerted, at given dump angles, by the hoist shown in FIG. 8.
Figure 10:
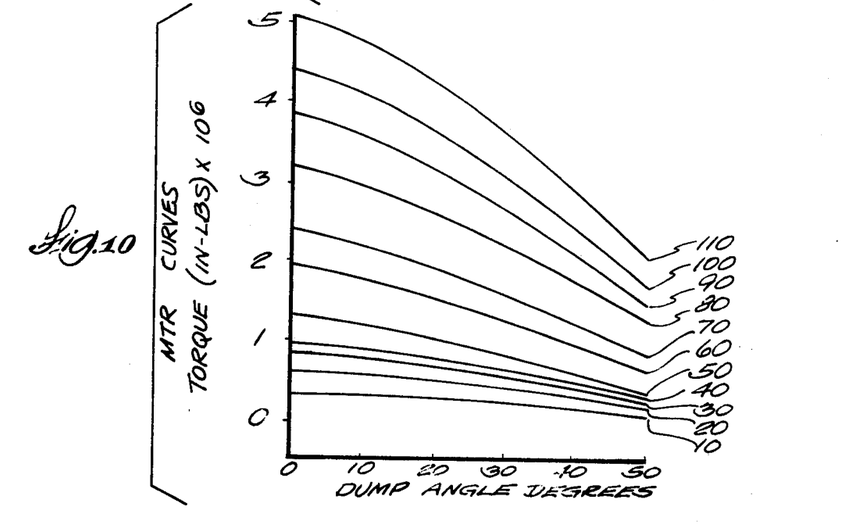
FIG. 10 is a graphical representation of a plurality of MTR curves establishing or corresponding to classes in which hoists can be certified.

An MTR curve for each clas can be plotted by solving the equation shown in FIG. 5a for several values of dump angle from breakaway through a maximum dump angle, for example, 50°. A MTR curve for Class 30 is shown in FIG. 7, a MTR curve for Class 60 is shown in FIG. 9, and a plurality of MTR curves corresponding to all the classes listed above is shown in FIG. 10 (located below FIG. 5a).

Figure 6:
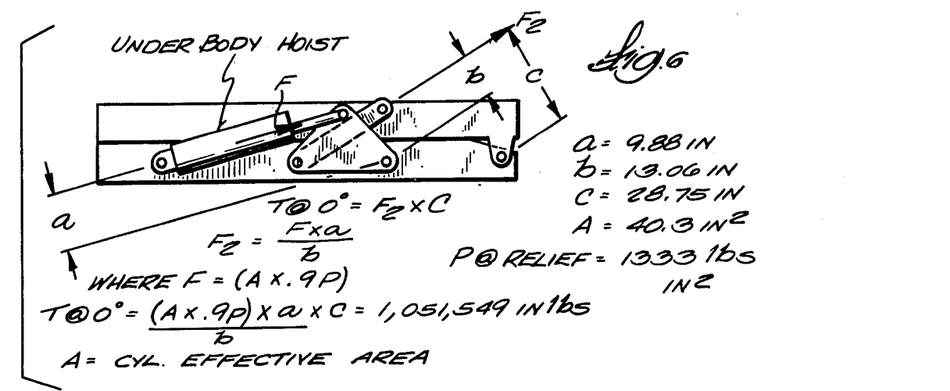
FIGS. 6 and 6a are diagrammatical views of a hoist mechanism including labelled dimensions used with an illustrated mathematical formula for determining the torque exerted by the hoist throughout a range of dump angles.
Figure 7:
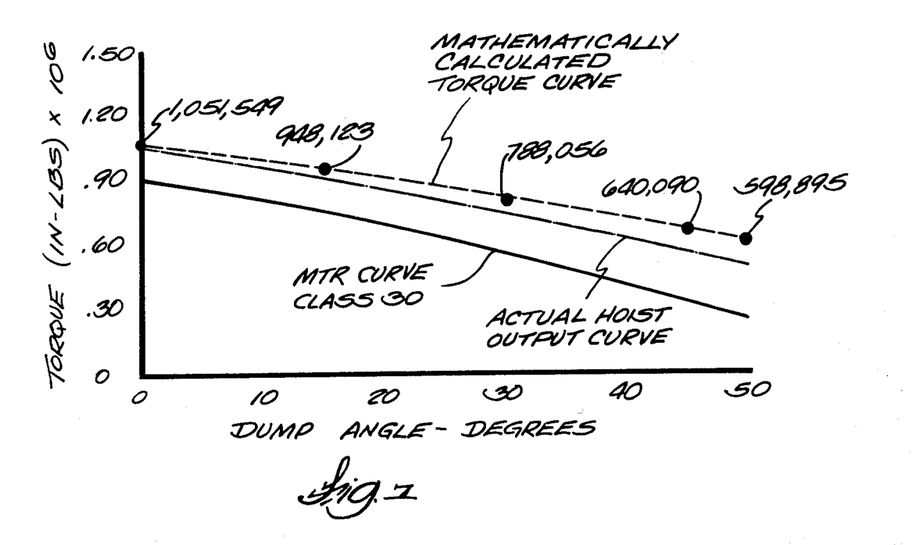
FIG. 7 is a graphical representation of a class 30 MTR curve and a plot of a torque curve determined by the mathematical calculation of torque exerted, at given dump angels, by the hoist shown in FIG. 6.

Shown diagrammatically in FIG. 6 is a typical underbody hoist having an arm configuration with labelled variable dimensions "a", "b", and "c" which are incorporated in the mathematical formula shown to calculate values of torque used to plot a mathematical torque curve which is compared with the MTR curve for the given class in which the hoist is to be certified (See FIG. 7). "A" stands for the hoist cylinder effective area, for example, 40.3 square inches, and "p" stands for the relief pressure, for example, 1333 lbs. per square inch. With values of the dimensions a, b, and c as illustrated, the torque at breakaway or zero degrees is calculated to be 1,051,549 inch pounds.

Figure 6A:
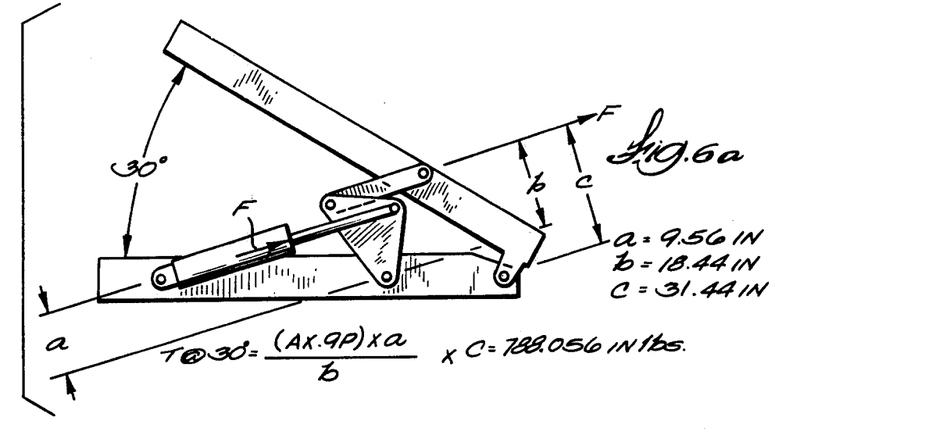

As shown in FIG. 6a, where the hoist has pivoted the dump body to a dump angle of 30°, the torque exerted by the hoist is calculated to be 788,056 inch pounds. In order to obtain a mathematical torque curve for comparsion with the MTR curve, other values of torque can be calculated at other dump angles, for example, at 15°, 45° and 50°, as shown in FIG. 7 where a output torque curve for the typical hoist shown in FIG. 6 is plotted in dashed lines. As illustrated, the mathematically calculated hoist torque curve exceeds the MTR curve of class 30 throughout the dump angle range from 0 to 50°. This mathematical calculation could be utilized to provide an initial determination that the hoist exceed the torque requirements to be categorized in Class 30.

Figure 8:
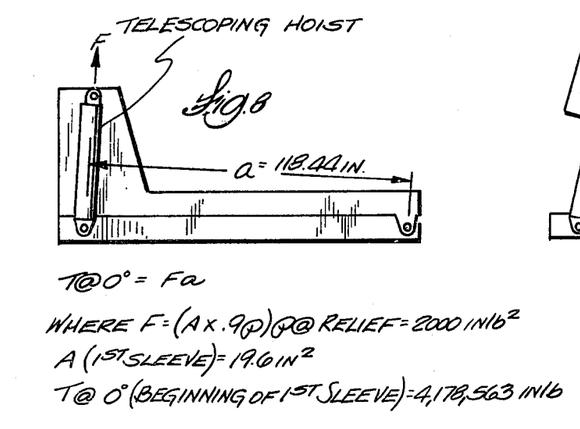
FIGS. 8, 8a, 8b, and 8c are diagramatical views of a telescoping hoist mechanism including labelled dimensions used with an illlustrated mathematical formula for determing the torque exerted by the telescoping hoist as different sleeve stages become operative to lift the dump body.
Figure 8A:
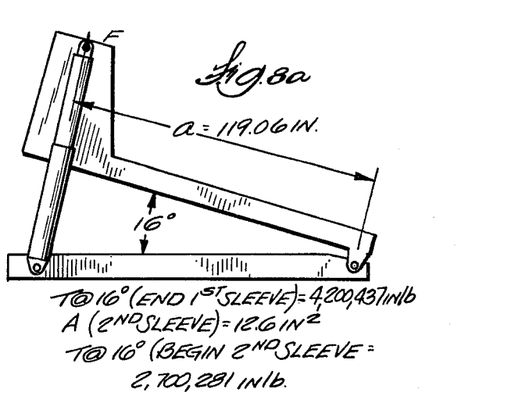
Figure 8B:
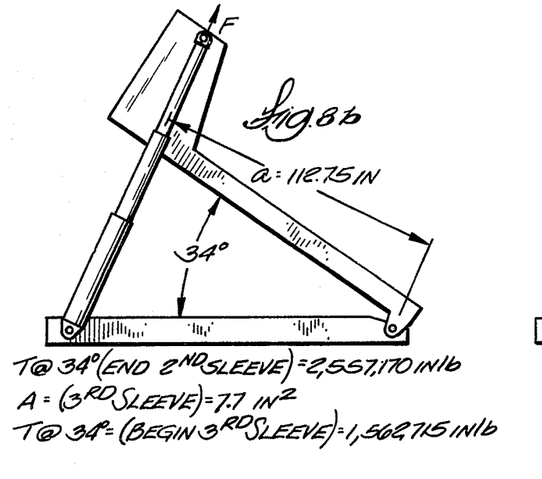
Figure 8C:
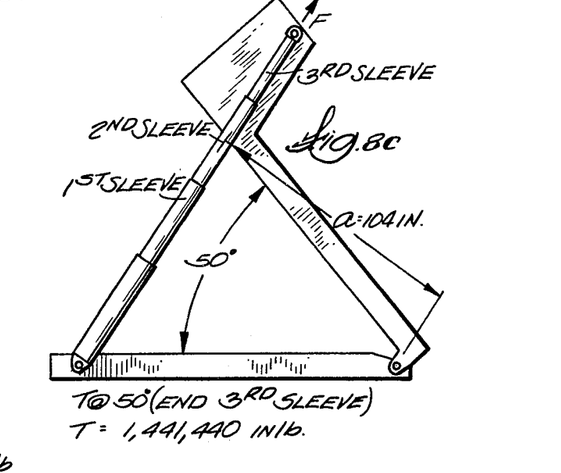

Shown in FIG. 8 is a diagrammatic representation of a typical telescoping hoist with labelled variable dimension "a" and formulas for determining the torque exerted by the hoist to establish a mathematical torque curve for comparison with an MTR curve, for example, corresponding to Class 60. As illustrated in FIGS. 8, 8a, 8b, and 8c, the cylinder effective area reduces as the first, second, and third cylinder sleeves are rendered operative through the dump cycle. The effective cylinder area "A" during movement of the first movable sleeve, for example, is 19.6 square inches. During movement of the second sleeve, the area is 12.6 square inches, and during movement of the third sleeve, 7.7 square inches. The relief pressure of this typical hoist is 2,000 lbs. per square inch. With these values and the distance "a" as shown, the breakaway torque is determined to be 4,178,563 inch pounds.

As illustrated and labelled in FIG. 9, the torque of the telescoping hoist is a step function dependent upon which movable sleeve is operative to lift the dump body. For example, at a dump angle of 16° and at the end of movement of the first sleeve, the torque exerted is 4,200,437 inch pounds, while the torque at the beginning of movement of the second sleeve drops to 2,700,281 inch pounds. The torque exerted at a dump angle of 34° at the end of movement of the second sleeve is 2,557,170 inch pounds, while at the beginning of movement of the third sleeve the torque is 1,562,715 inch pounds. The torque at the end of movement of the third sleeve at a dump angle of 50° is 1,441,440 inch pounds. As shown in FIG. 9, the hoist exceeds the MTR curve for Class 60 throughout the dump range. Accordingly, this typical hoist meets the minimum torque requirement curve required to be in Class 60. As noted earlier, FIG. 10 is a graphical representation of a plurality of MTR curves corresponding to the various classes in which a hoist can be certified.

In order to determine or certify whether a given dump hoist actually physically exerts a torque which meets or exceeds the MTR curve of a given class, the test apparatus 10, previously mentioned and shown in FIG. 1, can be utilized.

Returning to a description of the test apparatus shown in FIG. 1, the test apparatus 10 includes base frame means or a base frame, generally designated 14, which simulates a truck chassis and is made up of a pair of longitudinal members 16 suitably secured to legs or supports 18 which elevate and fix the longitudinal members 16 above ground or floor level. Upper frame means, or an upper frame, generally designated 20, simulates the under-structure portion of a dump body and is made up of a pair of longitudinal members 22 connected to cross members 24. The upper frame 20 is pivotally secured to the base frame 14 by suitable hinge means, such as hinge 26. It is to be understood that various base and upper frame arrangements could be utilized, and such arrangements are to be adequately sized and reinforced to accept the input load forces of the specific hydraulic hoist being tested for operation through its entire dump angle cycle.

The base and upper frame are adapted for allowing mounting of the test hoist 12 according to the manufacturer's mounting specification. As illustrated in FIG. 1, for example, a pair of brackets 31 (ones shown), are secured to the longitudinal member 16 and adapted so that bolts can be utilized to secure the hoist mounting plate 32, supplied by the hoist manufacturer, to the brackets. Also, a conventional upper mounting basket supplied by the hoist manufacturer (not shown), can be secured, for example, to the cross members 24 extending between the pair of longitudinal members 22 of the upper frame. If necessary, other means could be utilized for adapting the base and upper frames so that a dump hoist can be mounted in accordance with the manufacturer's specifications.

A dump angle indicator 56, which indicates the dump angle, or the angle of the upper frame 20 relative to the base frame 14, is secured to frame 20.

Longitudinally adjustable restraining means, preferably in the form of tension link means or a pair of tension link assemblies 38 (shown in FIG. 1), are provided in order to restrain the upper frame 20 to the base frame 14 at selected incremental dump angles. Each tension link assembly 38 includes a replaceable extension rod end 40 suitably pivotally secured to the upper pivotal frame 20, and adjustably secured through use of a turnbuckle 42 to an intermediate rod 44, also adjustably secured in the other end of turnbuckle 42.

The tension link 38 assemblies also each include a lower rod 46 suitably pivotally secured to the base frame 14, and transducer means 48 for providing an output proportional to the longitudinal force exerted on the restraining means or tension link assemblies. As illustrated the transducer means can comprise a commerically available tension load cell 48, preferably secured in the tension link assembly 38 between the lower and intermediate rods 44 and 46. The extension rod ends 40 can be replaced with rod ends of varying lengths, for example, 40a, 40b or 40c (shown with phantom lines), so that, in combination with adjustment of the turnbuckles 42, any restrained incremental dump angle from breakaway or zero degrees up to a maximum dump angle for the test hoist, can be selected. The tension load cells 48 provide outputs carried along lines 50 to commercially available instrumentation, shown diagrammatically by box 52, to provide a read-out of the forces exerted on each of the tension link assemblies 38.

As illustrated in FIG. 1a, a different longitudinally adjustable restraining means arrangement could be utilized. For example, instead of tension link assemblies 38, the restraining means could comprises a pair of restraining arms 80 (one shown) having a plurality of apertures 82, and which preferably extend within U-shaped brackets 84 mounted on the sides of the longitudinal members 22 of the upper frame 20. The brackets 84 and upper frame 20 can be pivoted or displaced relative to the arms 80 until the desired incremental dump angle is obtained, at which point the upper frame can be secured to the arms 80 by inserting a pin 88 through a hole 82 in each arm, which hole 82 is alligned with holes (not specifically labelled or shown) in the U-shaped brackets 84 and the members 22 of the upper frame.

As diagrammatically illustrated, each of the restraining arms 80 includes a lower end portion, generally designated 79, having incorporated therein suitable transducer means or load cells, 48a, and including fine adjustment means, generally designated 81, for adjustably securing the lower end portion to a bracket 83 fixed to a longitudinal member 16 of base frame 14 as shown. While various arrangements could be utilized, such fine adjustment means, as shown in the illustrated construction, comprises the lower end portion 79 of the arm 80 including a slot 87, and a large wing nut 91 which threadingly engages a bolt 89 which extends through the slot 87 and a circular aperture (not shown) in the bracket 83. After the slot 87 of the arm 80 is moved relative to the bolt 89 to obtain a fine adjustment, the wing nut 91 can be tightened to clamp to the lower end of the arm 80 to the bracket 83, and hence, to the base frame 14. Thus, the upper frame 20 can be restained to the base frame at selected incremental dump angles by movement of the upper frame 20 and selection of appropriate apertures 82 in the restraining arms 80, while fine adjustment can be provided by operation of the fine adjustment means 81 at the lower ends of the arms 80.

In order to render the hydraulic test hoist 12 operative so that the torque exerted by the hoist can be determined, a hydraulic power unit 60 is provided to supply fluid carried by line 61 to the hoist cylinders at a pressure equal to the manufacturer's suggested maximum hydraulic fluid pressure rating. As shown schematically, the power unit 60 includes a hydraulic pump 64, an adjustable relief valve 66, and a control valve 68 for regulating the pressure of the hydraulic fluid supplied to the hoist being tested.

A commercially available pressure transducer 70 is included in line 61 which feeds the hoist cylinders to monitor the hydraulic pressure so that control valve 68 can be adjusted to insure that the hoist is tested at the manufacturer's maximum rated hydraulic pressure. The pressure transducer 70 is connected by line 72 to the instrumentation 52 which can be switched and calibrated to provide a suitable visual display of the hydraulic pressure.

The instrumentation 52 could comprise, for example, the BLH Model 1200 strain gage scanning system manufactured by BLH Electronics, Inc., 42 Fourth Avenue, Waltham, Mass. The Fluid pressure transducer 70 could comprise, for example, a BLH electronics type DHF high frequency pressure transducer having a suitable pressure range. The load cells 48 could comprise, for example, a Lebow load cell Model No. 3124.

A preferred method for determining or certifying whether a test hoist meets a MTR curve for a given class utilizing, for example, the preferred test apparatus 10 shown in FIG. 1, is described below. For purposes of this description, the "output hoist torque" exerted by the hoist at a given dump angle and utilized to establish an actual torque curve is the sum of the "measured torque" and the "compensation torque" required to be exerted by the hoist to lift the weight of the upper frame 20.

Referring to FIG. 2, which is a partial diagrammatic view of the test apparatus 10 shown in FIG. 1, the torque at breakaway or zero degrees (wherein the upper pivotal frame 20 is shown in solid lines) is determined. More particularly, the tension link assemblies 38 are made up with extension rods 40 of suitable length and adjusted so that the dump angle between the upper pivotal frame 20 and base frame 14 is restrained to zero degrees. Fluid is then supplied to the test hoist 12 at the manufacturer's maximum rated operating pressure. In order to first determine the measured torque, the separate forces in pounds applied to each of the tension load cells 48, as indicated by the readout of instrumentation 52, are added. The sum is then multiplied by the length in inches of the variable lever arm distance designated "A" extending between the tension link assemblies 38 and the hinge 26. The resulting product, expressed in inch pounds, is the measured torque.

In order to determine the "compensation torque", which is the torque exerted by the hoist to lift the weight of the upper frame 20, the weight of the upper pivotal frame 20 is multiplied by the length of the variable lever arm distance designated "B" extending from the center of gravity of the pivotal frame 20 to the hinge 26. The measured torque and compensation torque are added to determine the hoist torque exerted by the hoist at the particular dump angle measured.

Figure 3:
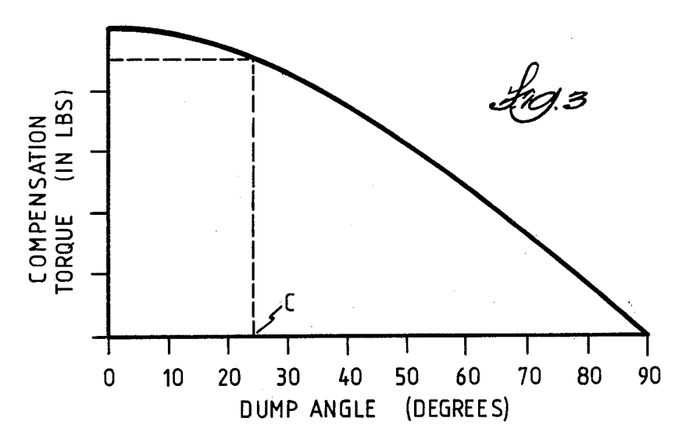
FIG. 3 is a graphical representation of the upper frame compensation torque, in inch lbs. versus dump angle, for the upper frame included in the test apparatus shown in FIG. 1.
Figure 4:
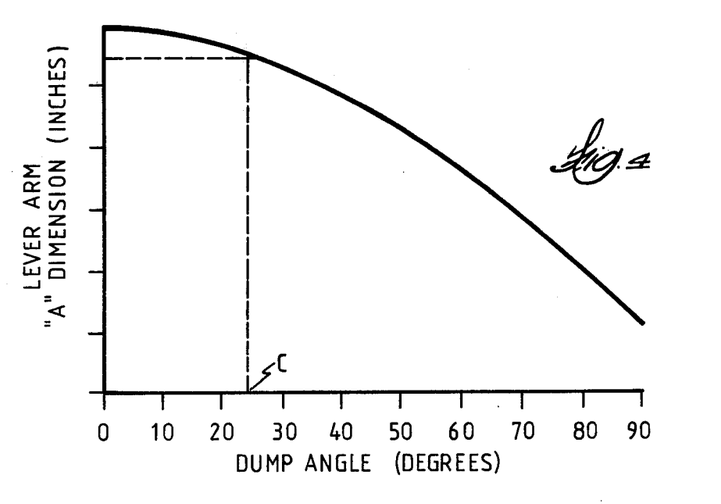
FIG. 4 is a graphical representation of the lever arm length "A" versus dump angle for the upper frame included in the test apparatus shown in FIG. 1.

In order to assist in calculation of the measured torque, the varying lever arm length "A" can be predetermined for a given dump angle, and presented in easily readable form, such as the graphical representation of lever arm length versus dump angle, as illustrated in FIG. 4. Similarly, in order to provide a rapid determination of the compensation torque for a given dump angle, the compesation torque can be predetermined for a given upper pivotal frame 20 and presented in readable form, such as the graphical representation of compensation torque versus dump angle, as illustrated in FIG. 3. Thus, in order to determine the hoist torque exerted by the test hoist for a given dump angle, the sum of the forces applied to the tension load cells 48 is multiplied times the lever arm distance "A" taken for example, from the graph of FIG. 4 for a given dump angle, to provide the measured torque, and the compensation torque is taken, for example, from the graph of FIG. 3 at that given dump angle, and added to the measured torque to determine the hoist output torque.

In order to determine whether the hoist torque exerted by the hoist meets the MTR curve for a given class, the tension link assemblies 38 are adjusted so that the restrained dump angle is successively increased or incremented, for example by 5°. An incremented dump angle, designated "c", is shown in FIG. 2. The sum of the forces applied to the load cells 48, while the pivotal movement of the upper pivotal frame is restrained to the angle "c", is multiplied by the length of lever arm "A" taken, for example, from the graph of FIG. 4 for dump angle "c". The compensation torque at dump angle "c" is taken from, for example, the graph of FIG. 3. The sum of the measured and compensation torques determines the hoist output torque for the dump angle "c".

This test procedure is repeated for given incremented dump angles up to the maximum permissible dump angle of the hoist.

As illustrated in FIG. 9, the torque exerted by the hoist at various incremental dump angles can be plotted (shown in dotted and dashed lines) to define a torque output curve which can be compared to the MTR curve to determine if the hoist can be certified in a class corresponding to the MTR curve. The hoist output torque can be determined at an angle intermediate two incremental dump angles if their is a substantial variation in hoist torque values at the two incremental angles, for example, as would be encounted with the actual torque curve of the telescoping hoist plotted in FIG. 9. If all the points of the actual torque curve of the hoist are on or above the minimum body and payload torque requirement curve, the hoist can then be certified for the established class. The torque output curve can also be compared to the mathematically calculated torque output curve to determine how the actual hoist output torque characteristics depart from the mathematical ideal.

It is to be understood that the invention is not limited to the particular method and construction or arrangement of parts as herein illustrated and described, but embraces all such modified forms thereof as come within the scope of the following claims.

I claim:

1. Test apparatus for determining the output torque exerted by a hydraulic hoist mechanism suitable for use in dump body applications, comprising
    base frame means for simulating a truck chassis,
    upper frame means for simulating the under-structure portion of a dumping body,
    hinge means for pivotally connecting said upper frame means to said base frame means, said pivotally connected base and upper frame means being adapted for allowing mounting of the hoist mechanism to said base and upper frame means so that the hoist mechanism can be rendered operative to pivot said upper frame means relative to said base frame means through a predetermined range of dump angles, and
    longitudinally adjustable restraining means displaced from said hinge means and connected to said base and upper frame means for restraining pivotal movement of said upper frame means to selected incremental dump angles within said predetermined range of dump angles, and including transducer means for providing an output proportional to the longitudinal force exerted on said restraining means.

2. Test apparatus in accordance with claim 1 further comprising hydraulic pressure source means connected to the hoist mechanism for supplying fluid to the hoist mechanism at the hoist manufacturer's maximum rate pressure to render the hoist mechanism operative to pivot said upper frame means and cause a longitudinal force to be exerted on said restraining means at a selected incremental dump angle.

3. Test apparatus in accordance with claim 2 further comprising instrumentation means connected to said output of said transducer means and calibrated for providing a readout of the longitudinal force exerted on said restraining means at a selected incremental dump angle.

4. Test apparatus in accordance with claim 3 further comprising pressure transducer means connected to said hydraulic pressure source means and having an output coupled to said instrumentation means for producing an output for providing a readout of the pressure of the fluid supplied to the hoist mechanism.

5. Test apparatus in accordance with claim 1 further comprising means for indicating the angle of said upper frame with respect to said base frame.

6. Test apparatus in accordance with claim 1 wherein said restraining means comprises a pair of tension link assemblies each including means for adjusting the longitudinal length of said assembly and said transducer means comprises a tension load cell included in each tension link assembly for providing an output proportional to the longitudinal force exerted on said tension link assembly.

7. Test apparatus in accordance with claim 6 wherein said adjusting means in each of said tension link assemblies includes replaceable extension rods of varying length, with selected length rods pivotally secured to said base and upper frame means, and also includes turnbuckles for connecting said selected length rods and for allowing adjustment of the longitudinal length of said tension link assembly.

8. Test apparatus for determining the output torque exerted by a hydraulic hoist mechanism suitable for use in dump body applications, comprising base frame means for simulating a truck chassis upper frame means for simulating the under-structure portion of a dumping body, hinge means for pivotally connecting said upper frame means to said base frame means, said pivotally connected base and upper frame means being adapted for allowing mounting of the hoist mechanism to said base and upper frame means so that the hoist mechanism can be rendered operative to pivot said upper frame means relative to said base frame means through a predetermined range of dump angles, longitudinally adjustable restraining means displaced from said hinge means and connected to said base and upper frame means for restraining pivotal movement of said upper frame means to selected incremental dump angles within said predetermined range of dump angles, and including tension load cell means for providing an output proportional to the longitudinal force exerted on said restraining means, hydraulic pressure source means connected to the hoist mechanism for supplying fluid to the hoist mechanism at the hoist mechanism manufacturer's maximum rated pressure to render the hoist mechanism operative to pivot said upper frame means and cause a longitudinal force to be exerted on said restraining means at a selected incremental dump angle, and instrumentation means connected to said output of said tension load cell means and calibrated for providing a readout of the longitudinal force exerted on said restraining means at a selected incremental dump angle.

9. A method for use in determining the output torque exerted by a hydraulic hoist mechanism utilized in dump body applications, comprising the steps of mounting the hoist mechanism to pivotally connected base and upper frames so that the hoist mechanism can be rendered operative to pivot the upper frame relative to the base frame through a predetermined range of dump angles, restraining the pivotal movement of the upper frame to a selected dump angle within said predetermined range by adjustment of longitudinally adjustable restraining means connected to the base and upper frames, the restraining means including tension load cell means for providing an output proportional to the longitudinal force exerted on the tension link means, supplying fluid to the hoist mechanism at the hoist mechanism manufacturer's maximum rated pressure to render the hoist mechanism operative to pivot the upper frame and cause a longitudinal force to be exerted on the restraining means at the selected dump angle, and processing the output of the tension load cell means for determining the longitudinal force exerted on the restraining means at the selected dump angle.

10. A method for use in determining whether a hydraulic hoist mechanism utilized in dump body applications meets a minimum body and payload torque requirement curve for a given hoist class, comprising the steps of mounting the hoist mechanism to pivotally connected base and upper frames so that the hoist mechanism can be rendered operative to pivot the upper frame relative to the base frame from zero degrees through a maximum dump angle, successively restraining the pivotal movement of the upper frame to predetermined incremental dump angles increasing from zero degrees to the maximum dump angle through use of longitudinally adjustable restraining means connected to the base and upper frames, the restraining means including tension load cell means for providing an output proportional to the longitudinal force exerted on the restraining means, supplying fluid to the hoist mechanism at the hoist mechanism manufacturer's maximum rated pressure to render the hoist mechanism operative to pivot the upper frame and cause a longitudinal force to be exerted on the restraining means at each of the incremental dump angles, and processing the output of the tension load cell means for determining the longitudinal force exerted on the restraining means at each of the incremental dump angles.

11. The method in accordance with claim 10 further comprising the steps of measuring the lever-arm length between the restraining means and the point of pivotal connection of the base and upper frames for each of the predetermined incremental dump angles.

12. The method in accordance with claim 11 further comprising the step of recording measurements of the length of the lever-arm and the predetermined incremental dump angles at which the lengths occurred in readable form for repetitive use in determining the torque exerted by any hydraulic hoist mechanism mounted to the pivotally connected base and upper frames.

13. The method in accordance with claim 10 further comprising the steps of measuring the compensation torque required to be exerted by the hoist mechanism to lift the weight of the upper frame for each of the incremental dump angles.

14. The method in accordance with claim 13 further comprising the step of recording the measurements of the compensation torque and the predetermined incremental dump angles at which the compensation torque occurred in readable form for repetitive use in determining the torque exerted by any hydraulic hoist mechanism mounted to the pivotally connected base and upper frames.

15. A method for use in determining whether a test hydraulic hoist mechanism utilized in dump body applications meets a minimum body and payload torque requirement curve for a given hoist class, comprising the steps of mounting the hoist mechanism to pivotally connected base and upper frames so that the hoist mechanism can be rendered operative to pivot the upper frame relative to the base frame from zero degrees through a maximum dump angle, successively restraining the pivotal movement of the upper frame from zero degrees to the maximum dump angle through use of longitudinally adjustable restraining means connected to the base and upper frames, the restraining means including tension load cell means for providing an output proportional to the longitudinal force exerted on the restraining means, supplying fluid to the hoist mechanism at the hoist mechanism manufacturer's maximum rated pressure to render the hoist mechanism operative to pivot the upper frame and cause a longitudinal force to be exerted on the restraining means at each of the incremental dump angles, processing the output of the tension load cell means for determining the longitudinal force exerted on the restraining means at each of the incremental dump angles, measuring and recording the lever-arm length between the restraining means and the point of pivotal connection of the base and upper frames and recording the incremental dump angles at which the lengths occur for repetitive use in determining the torque exerted by any hydraulic hoist mechanism mounted to the pivotally connected base and upper frames, and measuring and recording the compensation torque required to be exerted by the hoist mechanism to lift the weight of the upper frame for each of the incremental dump angles, and recording the incremental dump angles at which said compensation torques occur for repetitive use in determing the torque exerted by any hydraulic hoist mechanism mounted to the pivotally connected base and upper frames.

16. The method in accordance with claim 15 further comprising the step of restraining the pivotal movement of the upper frame to an intermediate dump angle between two adjacent incremental dump angles at which the values of longitudinal forces substantially varied, in order to determine the longitudinal force exerted at the intermediate dump angle and to more accurately determine the output torque exerted by the hydraulic hoist mechanism.

* * * * *